United States Patent [19]

Melancon

[11] 4,413,014
[45] Nov. 1, 1983

[54] FISH BAIT AND METHOD OF MANUFACTURING THE SAME

[76] Inventor: Ronald D. Melancon, 1604 E. Bridge, Breaux Bridge, La., 70517

[21] Appl. No.: 238,544

[22] Filed: Feb. 26, 1981

[51] Int. Cl.³ .............................. A23K 1/18; A23B 7/16
[52] U.S. Cl. .......................................... 426/1; 426/289; 426/302; 426/805; 426/615; 426/102; 426/282
[58] Field of Search ................... 426/1, 805, 615, 302, 426/310, 282, 289, 507, 102, 282; 43/42.06, 42.35, 44.99

[56] References Cited

U.S. PATENT DOCUMENTS

| 17,697 | 6/1857 | Rowe | 426/615 |
|---|---|---|---|
| 1,358,985 | 11/1920 | Picht | 426/1 |
| 2,631,937 | 3/1953 | Buss | 426/1 |
| 2,827,376 | 3/1958 | Breuer | 426/1 |
| 2,951,761 | 9/1960 | Stephan | 426/1 |
| 3,607,294 | 9/1971 | Evnstrom | 426/1 |
| 3,672,910 | 6/1972 | Moore | 426/1 |
| 4,143,167 | 3/1979 | Blanchaud et al. | 426/262 |
| 4,160,847 | 7/1979 | Orth, Jr. | 426/1 |
| 4,251,547 | 2/1981 | Liggett | 426/289 |

FOREIGN PATENT DOCUMENTS 1585164  1/1970  France ........................... 426/1

Primary Examiner—Raymond N. Jones
Assistant Examiner—George C. Yeung
Attorney, Agent, or Firm—Guy E. Matthews

[57] ABSTRACT

Disclosed is a fish food or bait and a method of manufacturing same. The food or bait includes an edible porous member such as a dried ear of corn saturated with a fish attractant or nutrient. The dried ear of corn includes a cavity filled with an edible solid and it may be covered with an edible solid. The dried ear of corn may further be covered with a sealant.

7 Claims, 3 Drawing Figures

4,413,014

FISH BAIT AND METHOD OF MANUFACTURING THE SAME

BACKGROUND OF THE INVENTION

The present invention relates generally to fish food or bait, and more particularly to an artificial fish food or bait including a body of solid porous edible material saturated with a fish attractant liquid, and a method and apparatus for manufacturing same.

Commercial fisherman often use fish traps and cages to catch fish such as catfish and crustaceans such as crawfish, lobsters, and crabs. The traps or cages are constructed so as to be easy for the fish to enter, but difficult for the fish to exit. The traps are normally baited with a fish food or attractant, most commonly meat or fish scraps.

The fish are attracted to the trap or cage by the bait and enter the trap or cage to feed. As long as the bait remains in the traps, the fish will continue to feed on the bait. However, if the fish consume all of the bait before the trap is retreived by the fisherman, the fish will attempt, often successfully, to escape the trap.

It is therefore an object of the present invention to provide a long lasting fish food that is suitable for use as bait.

SUMMARY OF THE INVENTION

Briefly stated, the foregoing and other objects of the present invention are accomplished by providing an article of fish food which includes an edible solid porous body saturated with a fish attractant liquid. The porous body is conveniently a dried ear of corn and the fish attractant liquid is conveniently a mixture of animal blood and salt. The salt serves as a preservative and anticoagulant to maintain the blood in a liquid state to attract more readily the fish. The body may also have a cavity formed therein filled with an edible solid, such as cheese or meat scraps or the like. The body may also have a coating of an edible solid material, such as cheese, thereon, and where the porous body is an ear of corn, the cheese may be compressed between and among the kernels of the corn. The article of the present invention may further be encapsulated with a sealant, such as wax, to preserve the article prior to use.

DESCRIPTION OF THE PREFERRED EMBODIMENT

Figure 1:
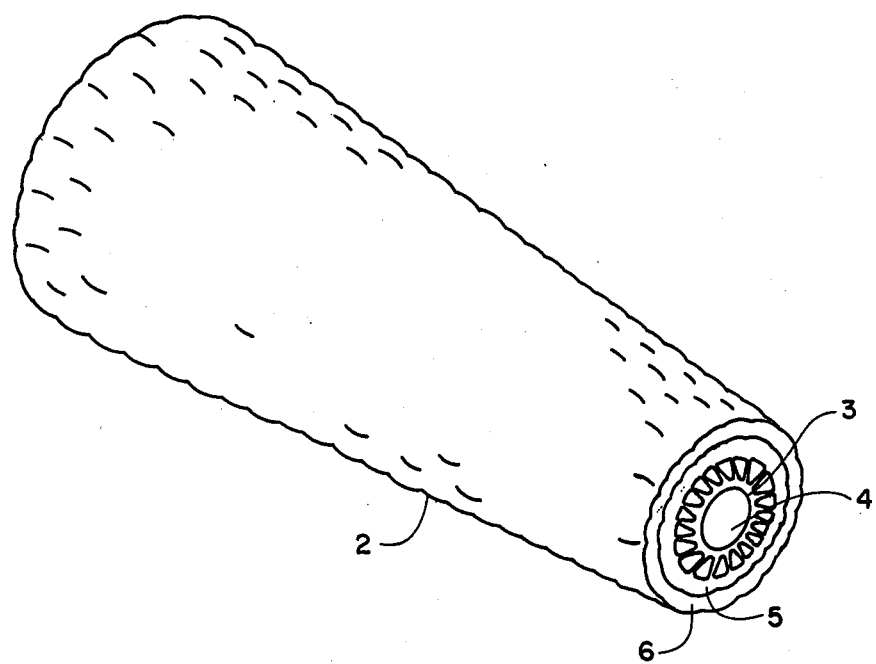
FIG. 1 is a perspective view of the article of the preferred embodiment of the present invention.

Referring now to the drawings, and first to FIG. 1, the article of the present invention includes a body formed of a solid porous edible material saturated with a fish attractant or nutrient liquid. In the preferred embodiment of the present invention, the body is a dried ear of corn 2 and the attractant or nutrient liquid is a mixture of animal blood and salt. The salt serves to preserve and maintain the blood in a liquid state. Those skilled in the art will recognize that porous bodies other than corn and attractant liquids other than blood may be used in the manufacture of the article of the present invention, but a dried ear of corn saturated with a mixture of animal blood and salt is the presently preferred embodiment of the article of the present invention.

It has been found that the central portion of an ear of corn is relatively impermeable to liquids. Accordingly, it may be desirable to drill out or otherwise form a cavity 3 in the central portion of the ear of corn. Cavity 3 may then be filled or packed with an edible solid 4, as for example cheese or meat scraps or by-products or the like. It may also be desirable to coat the exterior of the article of the present invention with a solid edible material such as cheese 5. Where the article is manufactured from an ear of corn, the cheese may be pressed about and between the kernels of the corn. It may also be desirable when storing or transporting the article of the present invention to encase or encapsulate the article in a sealant, as for example wax 6.

Figure 3:
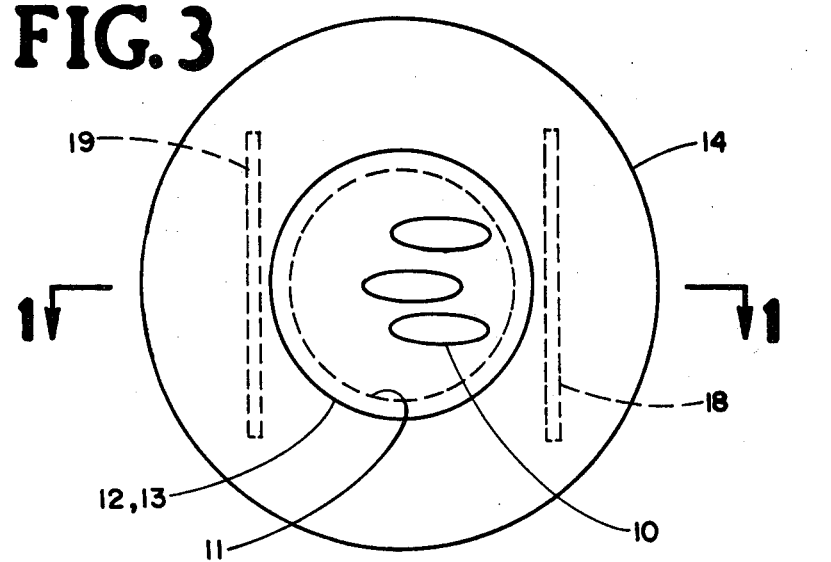
FIG. 3 is a top view of the preferred embodiment of the apparatus of the present invention.
Figure 2:
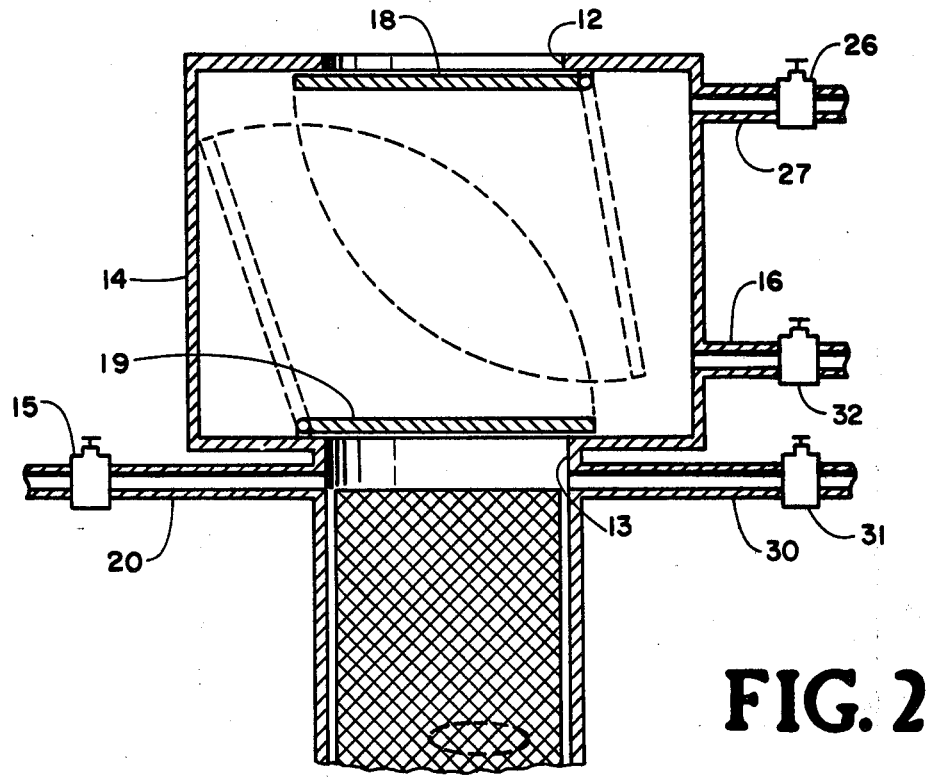
FIG. 2 is a vertical section of the preferred embodiment of an apparatus for manufacturing the articles of the present invention.

Referring now to FIGS. 2 and 3 there is illustrated an apparatus for manufacturing the article of the present invention. The apparatus includes a pressure vessel 17 that is adapted to receive and seal therein a removable mesh basket 11. Pressure vessel 17 has connected thereto an air lock chamber 14 having a top opening 12 and a bottom opening 13, which communicates with the interior of pressure vessel 17. Air lock chamber 14 includes an inwardly opening pressure door 18 and an inwardly opening vacuum door 19. Doors 18 and 19 are adapted to swing open and closed as shown in phamtom in FIG. 2.

A conduit 20 is provided in pressure vessel 17 for the movement of pressurized air into pressure vessel 17 through a valve 15. A conduit 30 is provided to communicate pressure vessel 17 with a vacuum pump or the like (not shown) for creating a vacuum within pressure vessel 17. A valve 31 is provided for closing conduit 30 to draw and maintain the vacuum within pressure vessel 17. A conduit 21 is provided at the bottom of pressure vessel 17 for the introduction into pressure vessel 17 of the fish attractant or nutrient liquid. Conduit 21 is opened and closed by means of a valve 25.

As can readily be visualized, when pressure vessel 17 is pressurized, door 18 seals opening 12. Similarly, when a vacuum is created within pressure vessel 17, door 18 normally swings open and door 19 seals opening 13. In order to make air lock chamber 14 quick-opening and quick-closing, a pressure conduit 27 with a valve 26 and a relief conduit 16 with a valve 32 are provided. Conduit 27 may be connected to a source of high pressure air and by admitting such high pressure air into air lock chamber 14, both doors 18 and 19 seal closed. Doors and 18 and 19 may be opened by venting air lock chamber 14 through relief conduit 16 with valve 32.

In operation, edible solid porous bodies, as for example dried ears of corn 10, are placed into basket 11, which is then deposited into pressure vessel 17 through openings 12 and 13. With valves 25 and 15 closed, the air in pressure vessel 17 is withdrawn through conduit 30. The vacuum thereby created in pressure vessel 17 which draws air from ears of corn 10, thereby allowing more complete saturation. Valve 31 is then closed and valve 25 is opened to allow the nutrient or attractant fluid as for example a mixture of blood and salt, to flow into pressure chambers 17 and saturate ears of corn 10. Valve 25 is then closed, and a pressure of greater than one atmosphere is introduced into pressure vessel 17 through conduit 20 to increase the saturation of ears of corn 10.

After a sufficient soak time, the pressure and pressure vessel 17 is equalized to one atmosphere and the attractant or nutrient liquid is drained therefrom through conduit 21. Basket 11 is then removed through openings 12 and 13.

The article of the present invention is very superior to the foods and baits of the present invention. Because ears of corn are very hard, they last a long time and great numbers of fish may be trapped. Also because of the edible nature of the materials used, the fish suffer no harm effect. It will be recognized that the article of the present invention could, in addition to being used in a fish trap or cage, as a fish food for fish farms or by sport fisherman to attract game fish.

From the foregoing it will be seen that this invention is one well adapted to attain all of the ends and objects hereinabove set forth, together with other advantages which are obvious and which are inherent to the article apparatus and method.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A process for manufacturing articles for consumption by fish, which comprises:
    saturating a dried ear of corn with a fish attractant liquid wherein said fish attractant material includes salt and blood, forming a cavity in the central portion of said ear of corn and filling said cavity with an edible solid.
2. The process as claimed in claim 1, including the further step of coating said ear of corn with an edible solid.
3. The process as claimed in claim 1, wherein said saturating step includes the steps of:
    forming a vacuum about said ear of corn in a non-immersed environment;
    immersing said ear of corn in said fish attractant liquid;
    and exerting a pressure greater than one atmosphere on said immersed ear of corn.
4. The process as claimed in claim 1, including the further step of encasing said saturated ear of corn with a sealant.
5. The process as claimed in claim 4, wherein said sealant includes wax.
6. An article for consumption by fish, which comprises a dried ear of corn saturated with a fish attractant liquid of salt and blood and further including a case of sealant surrounding said saturated ear of corn, said ear of corn has therein a central cavity filled with an edible solid.
7. The article as claimed in claim 6, wherein said sealant includes wax.

* * * * *